United States Patent
Bultitude et al.

(10) Patent No.: US 11,081,882 B2
(45) Date of Patent: Aug. 3, 2021

(54) ESD SUPPRESSION USING LIGHT EMISSIONS

(71) Applicant: KEMET Electronics Corporation, Simpsonville, SC (US)

(72) Inventors: John Bultitude, Simpsonville, SC (US); Lonnie G. Jones, Simpsonville, SC (US); Iain D. Kinnon, Simpsonville, SC (US); Nathan A. Reed, Simpsonville, SC (US); Jeffrey W. Bell, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 98 days.

(21) Appl. No.: 16/513,349

(22) Filed: Jul. 16, 2019

(65) Prior Publication Data

US 2020/0028356 A1 Jan. 23, 2020

Related U.S. Application Data

(60) Provisional application No. 62/700,624, filed on Jul. 19, 2018.

(51) Int. Cl.
*H02H 9/04* (2006.01)

(52) U.S. Cl.
CPC .................... *H02H 9/046* (2013.01)

(58) Field of Classification Search
CPC ...... H02H 3/04; H02H 3/22; H02H 9/04–046; H01L 27/0248; H01L 27/0255; H01L 27/0288; H01L 27/0296; H01L 27/15
See application file for complete search history.

(56) References Cited

U.S. PATENT DOCUMENTS

| | | | | |
|---|---|---|---|---|
| 6,547,249 B2* | 4/2003 | Collins, III | ........... | H01L 27/156 257/88 |
| 2008/0238702 A1* | 10/2008 | Yan | ......................... | H01L 23/60 340/653 |
| 2009/0230476 A1* | 9/2009 | Krutsick | ................. | H01L 23/60 257/360 |
| 2015/0249078 A1* | 9/2015 | Cao | ..................... | H01L 27/0255 257/546 |
| 2016/0259220 A1* | 9/2016 | Huang | ................. | G09G 3/3611 |
| 2018/0287376 A1* | 10/2018 | de Raad | .............. | H01L 27/0285 |
| 2020/0214117 A1* | 7/2020 | Chang | .................... | A41D 20/00 |

FOREIGN PATENT DOCUMENTS

KR 20020037689 A * 5/2002

* cited by examiner

*Primary Examiner* — Fred E Finch, III
(74) *Attorney, Agent, or Firm* — Joseph T. Guy; Patent Filing Specialist Inc.

(57) ABSTRACT

A protected electric circuit, and method of protecting a protected circuit is provided. The circuit comprises at least one sensitive device wherein the sensitive device operates at a device voltage and has a maximum voltage capability. At least one light emitting diode electrically connected with the sensitive device wherein the light emitting diode has a first trigger voltage wherein the first trigger voltage is above the device voltage and below the maximum voltage capability. When any said extraneous energy above the first trigger energy is experienced the light emitting diode emits photons thereby converting at least some of the extraneous energy to photon energy.

44 Claims, 5 Drawing Sheets

ESD SUPPRESSION USING LIGHT EMISSIONS

CROSS-REFERENCE TO RELATED APPLICATIONS

The present invention claims priority to U.S. Provisional Patent Application No. 62/700,624 filed Jul. 19, 2018 which is incorporated herein by reference.

FIELD OF THE INVENTION

The present invention is related to an improved electro-static discharge (ESD) device. More specifically, the present invention is related to a device capable of converting excess energy to photons thereby providing protection for an electronic circuit or device subjected to electro-static discharge.

BACKGROUND

There is an on-going need to protect sensitive electronics such as semiconductors, integrated circuits and components from Electro-Static Discharge (ESD) and fast electrical transients. As the miniaturization of electronics continues these smaller components have a reduced voltage withstanding capability or maximum voltage capability. This is critical since ESD can reach over 30 kV which is well beyond the core processor capability. ESD has become the primary cause of failure of integrated circuits in the field. Combatting this failure mode has resulted in more space in the semiconductor being devoted to protecting the core processor from ESD using on-chip protection techniques.

In addition to consuming valuable area, on-chip protection inhibits the speed and quantity of data that can be processed. For this reason, there is an increasing interest in improved on-chip protection and protection afforded by discrete components. The on-chip protection is usually provided by switching diodes that effectively switch the ESD to ground. Switching diodes are also used in discrete components.

Various forms of spark gap devices are also employed wherein the spark gap device redirects ESD discharges to ground when a certain threshold voltage is reached. Spark gap devices employ relatively small gaps compared with traditional gas discharge tubes and the gaps can contain dopants to facilitate consistent discharge with high speed reaction time such as <1 ns.

In addition to diodes and spark gap type devices, varistors have been used as ESD protection devices. Although varistors function adequately for discharge, varistors convert the discharge energy to heat which is often highly undesirable since it may be hard to dissipate the heat. Alternatively, the structural design may need to be altered to incorporate heat sinks, heat exchangers and the like when varistors are employed. Varistors also tend to become leaky after many ESD events and are difficult to engineer with low capacitance. Low capacitance is desirable to minimize signal distortion in many applications.

The currently available ESD suppression technologies are limited by the voltage and current capability, or by design requirements, which has led to a desire for new technological approaches to ESD suppression. Yet another problem is associated with monitoring ESD events and fast electrical transients. The prior art lacks a simple means to monitor ESD and fast transients since a high-speed oscilloscope is currently required to do this. In this invention light is emitted by the LED during these events thereby providing a means of monitoring.

Provided herein is a method of protecting a circuit from ESD or fast electrical transients wherein the excess voltage is converted to light instead of heat or dissipation to ground.

SUMMARY OF THE INVENTION

The present invention is related to an improved method of dissipating excess voltage arising from extraneous energy such as ESD events or fast electrical transients.

A particular feature of the instant invention is the ability to convert excess or extraneous energy to light energy or photons, as opposed to thermal energy, thereby minimizing the heat build which can occur during a voltage excursion.

A particular advantage is the ability to utilize the instant invention either alone or in concert with other ESD protection techniques to provide maximum protection for an electronic circuit.

Yet another feature of the invention is the ability to capture the photons emitted thereby providing for a monitoring system for tracking ESD events or fast transient events.

These and other embodiments, as will be realized, are provided in a protected electric circuit. The circuit comprises at least one sensitive device wherein the sensitive device operates at a device voltage and has a maximum voltage capability. At least one light emitting diode is in electrical connection, preferably in electrical parallel, with the sensitive device wherein the light emitting diode has a first trigger voltage wherein the first trigger voltage is above the device voltage and below the maximum voltage capability. When any extraneous energy above the first trigger energy is experienced the light emitting diode emits photons thereby converting at least some of the extraneous energy to photon energy.

Yet another embodiment is provided in a method of protecting an electric circuit. The method includes:
providing at least one sensitive device wherein the sensitive device operates at a device voltage and has a maximum voltage capability;
providing at least one light emitting diode in electrical connection, preferably in electrical parallel, with the sensitive device wherein the light emitting diode has a first trigger voltage wherein the first trigger voltage is above the device voltage and below the maximum voltage capability and wherein at any extraneous energy above the first trigger energy the light emitting diode emits photons thereby converting at least some of the extraneous energy to photon energy.

DESCRIPTION

The present invention is related to an improved ESD suppression device. More specifically, the present invention is related to an ESD suppression device capable of converting excess energy to light energy or photons which dissipates with minimal, if any, increase in temperature thereby minimizing the necessity of heat dissipation elements.

Described herein is an improved method of ESD protection. The electrical energy of the ESD discharge is converted to light energy using phosphors. Many scintillating phosphors have been developed that are suitable for providing a high level of electrical insulation between opposed electrodes but that scintillate once a threshold voltage is reached. Unlike varistors the resulting light energy can be dissipated or absorbed without detriment to the electrical performance of the circuit. The restrictions of diodes and spark gaps are overcome since the phosphors convert this discharge energy to photons. The conversion to light energy represents an additional way to convert the extraneous energy, such as from an ESD or fast electrical transient, compared to dissipating this energy to ground or by conversion to heat.

The invention will be described with reference to the figures forming an integral, but non-limiting, component of the disclosure. Throughout the various figures similar elements will be numbered accordingly.

Figure 1:
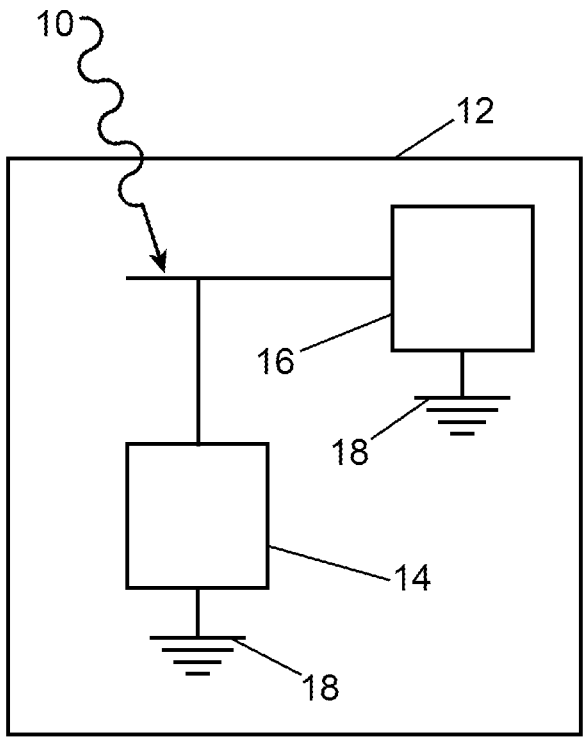
FIG. 1 is a schematic representation of a prior art device.

A prior art ESD device is illustrated graphically in FIG. 1. In FIG. 1, an extraneous energy event, 10, such as an ESD event or fast electrical transient is received by the device, 12, The extraneous energy event has an extraneous energy, $E_1$ wherein the extraneous energy is in addition to the device voltage wherein the device voltage is the intended operating voltage of the device. At least a portion of the extraneous energy is diverted by a conventional ESD ground device, 14, which diverts a portion of the extraneous energy to ground, 18, or to heat which is not illustrated. For the purposes of the instant disclosure the extraneous energy diverted to ground is referred to as grounded energy, $E_G$. The difference between the extraneous energy and grounded energy is referred to as device energy, $E_D$, wherein the device energy is that portion of extraneous energy which reaches the device, 16, which is intended to be protected. Mathematically, the device energy for the prior art device can be defined by Equation 1:

$$E_D = E_1 - E_G \quad \text{Equation 1}$$

As would be apparent to those of skill in the art it is the intent of an ESD device, of any type, to at least minimize the device energy, $E_D$, with a preference for an $E_D$ of near zero.

Figure 2:
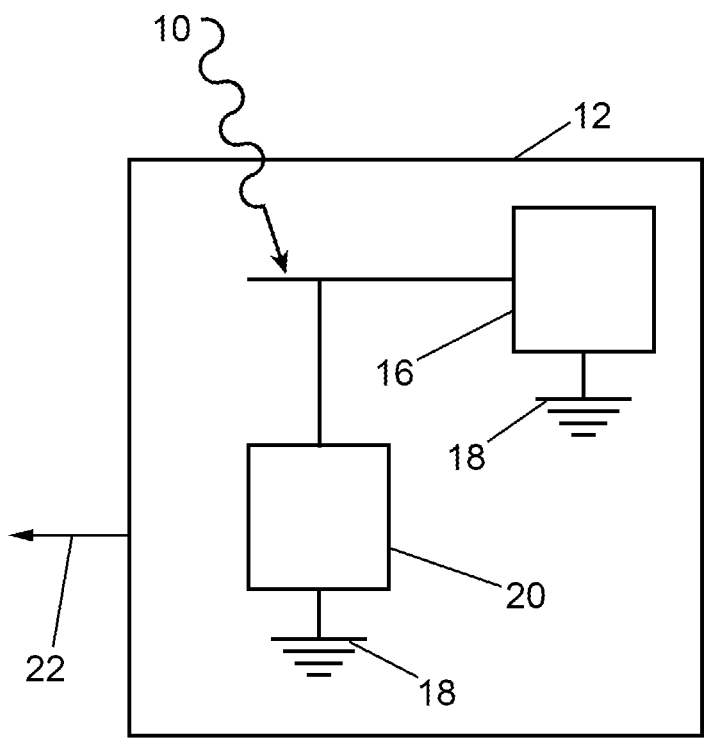
FIG. 2 is a schematic representation of an embodiment of the invention.

An embodiment of the invention is illustrated in, and will be describe with reference to, FIG. 2 wherein the extraneous energy into and out of devices during an ESD event is illustrated graphically. In FIG. 2, the extraneous energy event, 10, has an extraneous energy, $E_1$. A light emitting diode, 20, electrically connected to the device, 16, converts at least a portion of the extraneous energy, and preferably all of the extraneous energy, to photon energy, 22, wherein the photon energy is referred to as $E_P$. A portion of the extraneous energy may also be diverted to ground, 18, as grounded energy, $E_G$, either by the light emitting diode or by an additional device as will be described. Mathematically, the device energy for the inventive device can be defined by Equation 2:

$$E_D = E_1 - (E_G + E_P) \quad \text{Equation 2.}$$

In FIG. 2 the light emitting diode, 20, is illustrated as being electrically connected to the device, 16. It would be understood from the discussion herein that the light emitting diode and device may be in electrical parallel in some embodiments.

In a particularly preferred embodiment, at least 2% of the extraneous energy to no more than 40% of the extraneous energy is converted to photon energy. More preferably, at least 10%, and even more preferably at least 20% of the extraneous energy is converted to photon energy. It is preferred that at least 75% of the extraneous energy is dissipated as either photon energy or grounded energy and therefore the device energy is no more than 25% of the extraneous energy. More even more preferably at least 99% of the extraneous energy, is dissipated as either photon energy or grounded energy and therefore is preferably no more than 1% of the extraneous energy. Energy that is not diverted as grounded energy or photon energy is device energy, $E_D$, which is received by the device, 16, intended to be protected. Device energy is that energy, reported as voltage, above the intended operating voltage, or device voltage, experienced by the device. If a thermal dissipation device is included the energy absorbed by the thermal dissipation device is considered, however, since the thermal energy must be separately dissipated it is not considered in the determination of $E_D$ herein.

Figure 3:
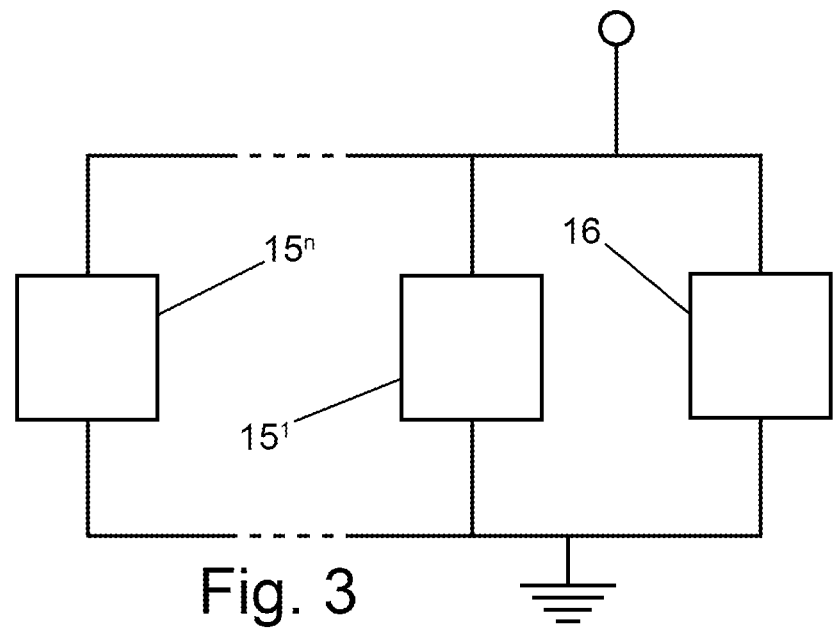
FIG. 3 is a schematic representation of an embodiment of the invention.

An embodiment of the invention will be described with reference to FIG. 3. In FIG. 3, a schematic diagram is provided for a protected device. The device, 16, being protected is electrically connected, illustrated in electrical parallel for convenience, with at least one ESD protection device, 15. In one embodiment multiple ESD protection devices are include with at least one ESD protection device being a light emitting diode. Other forms of ESD protection devices can be used in concert with, but not limited to, a light emitting diode such as spark gap devices, varistors, switching diodes and combinations thereof.

Figure 4:
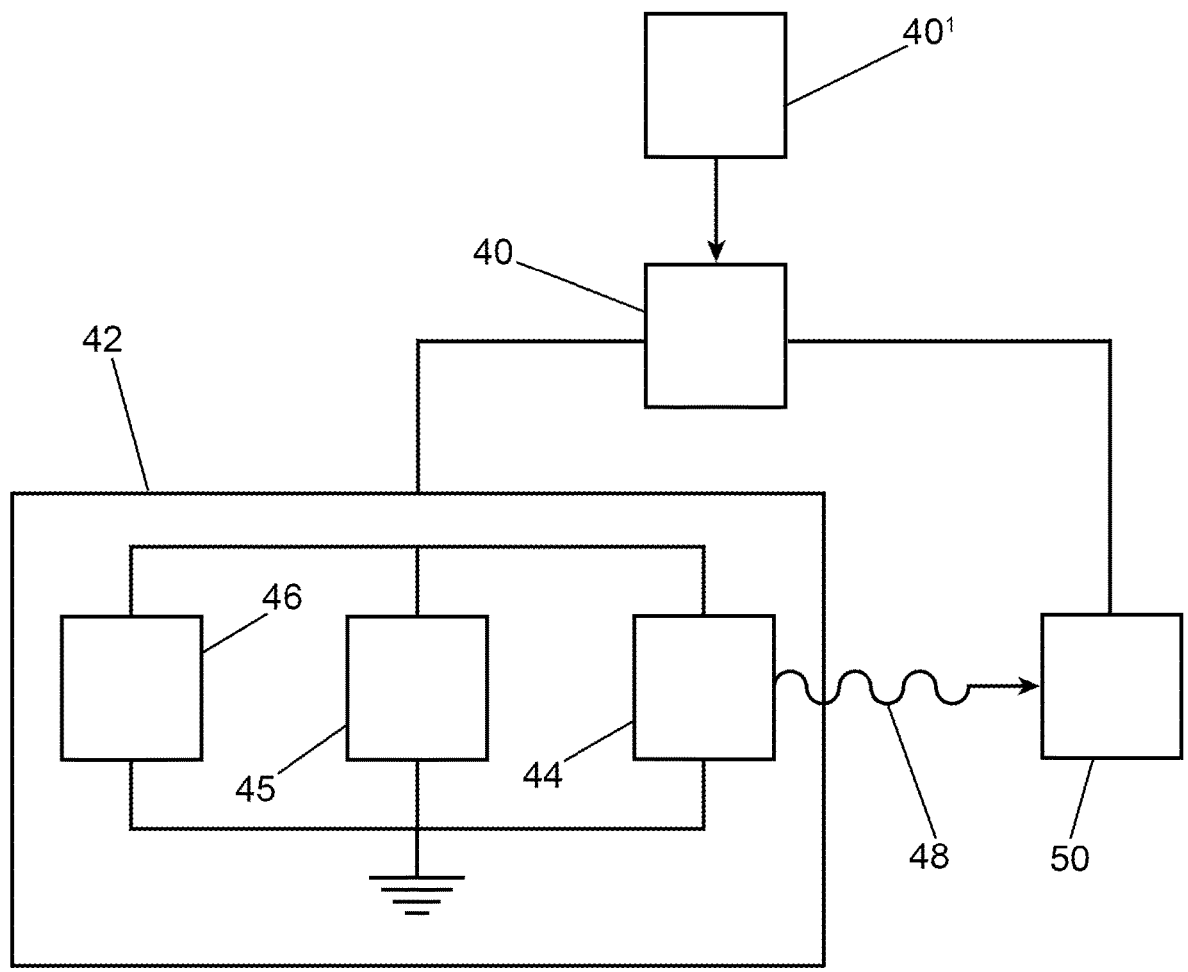
FIG. 4 is a schematic representation of an embodiment of the invention.

An embodiment of the invention will be described with reference to FIG. 4. In FIG. 4 a power source, 40, provides power to an electronic assembly, 42, wherein the power provides a device voltage, or that voltage at which the device is intended to operate. Included in the electronic assembly is a circuit comprising a light emitting diode, 44, electrically connected, preferably in electrical parallel, with a device, 46, which is being protected along with other optional electronic components, 45, if desired. The optional electronic components may include additional ESD protection devices. If the voltage provided by a secondary power source exceeds a trigger voltage of the light emitting diode, or a secondary voltage is encountered, the light emitting diode illuminates generating photons, 48. A detector, 50, is provided which can be integral to the electronic assembly or peripheral to the electronic assembly and which can be integral to either the light emitting diode or the protected device. The detector, 50, upon sensing the photons, can provide a signal to the power source, 40, and the power source may reduce power, take different action or take no action. In one embodiment an element, 40¹, is provided, which is either in communication with or integral to the power source, to record some aspect of the event. In a particularly preferred embodiment the power source, 40, reduces power until the detector, 50, ceases to register photons from the light emitting diode.

For the purposes of clarity, extraneous energy as defined herein refers to any energy originating from a source which is above that power intentionally provided by the power source. The extraneous energy may originate from the power source during adverse environmental events, such as a power spike to the power source resulting in an increase in power from the power source, or the result of an additional input of energy not related to the power source such as a lightning strike, static discharge or receipt of spurious voltage or unintended energy.

Figure 5:
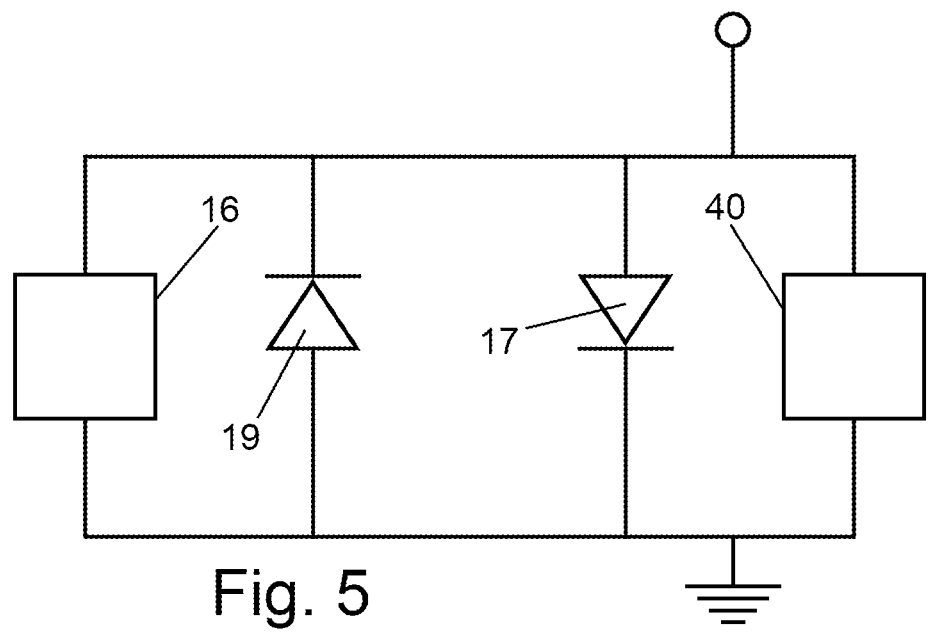
FIG. 5 is a schematic representation of an embodiment of the invention.

Light emitting diodes are polar devices and therefore they are typically connected to a circuit with forward polarity wherein the cathode is connected to ground. Light emitting diodes can be connected to a circuit with reverse polarity, with the anode connected to ground. With reverse polarity a higher failure rate typically occurs so this is less favorable. It is surprising that mounting multiple light emitting diodes in at least one bidirectional pair provides a synergistic relationship with regards to ESD suppression. In a bidirectional pair two light emitting diodes are connected, preferably in electrical parallel, with a power source, 40, and a device, 16, being protected wherein one light emitting diode has the anode connected to ground and the other emitting diode has the cathode connected to ground as illustrated schematically in FIG. 5 wherein light emitting diode, 17, has forward polarity and light emitting diode, 19, has reverse polarity.

Light emitting diodes, like conventional ESD protection devices, have a trigger voltage. In the case of a light emitting diode the trigger voltage is that threshold voltage below which they do not emit light and above which they emit light. The trigger voltage is a design feature and those of skill in the art would appreciate and understand the parameters which can be altered to adjust trigger voltage. When multiple ESD devices are used, either of the same type or a mixture of different types of ESD devices, the trigger voltage can be the same for any combination of ESD protection devices electrically connected. In a preferred embodiment the combination of ESD protection devices may have different trigger voltages thereby allowing the ESD protection devices to function at different levels of extraneous energy. In a particularly preferred embodiment the light emitting diode may have a lower trigger voltage than other ESD protection devices used therewith thereby allowing for the use of sensors whereby proactive measures may be utilized to avoid a full excursion in available energy pulse from an ESD event or fast transient event. For example, an illumination of the light emitting diode may generate a reduction in power to avoid, or at least mitigate, the circuit from being exposed to the entirety of the extraneous energy pulse. If the power reduction is insufficient in time or amount the secondary ESD protection devices may dissipate additional extraneous energy that exceeds the capability of the light emitting diode. By coupling light emitting diodes with other ESD protection devices mitigation features can be employed thereby further protecting sensitive circuits and devices.

The light emission can be used to sense the presence and intensity of ESD event or transient electrical surge events. This allows for responsive action such as the circuit being turned off or incoming power levels being reduced as necessary to protect the circuit. Multiple events could also be logged to monitor the number and intensity of occurrences. The ability to monitor the frequency and intensity of events may provide guidance for determination of root causes of the events thereby allowing designers to minimize the occurrence proactively.

Phosphors or semiconductors with capability across a broad electromagnetic spectrum are available with a variety of emission wavelengths suitable for demonstration of the invention. It is preferable to avoid infrared emission due to the propagation of heat. Group III nitride compound semiconductors are particularly suitable for use in forming a semiconductor light emitting diode that emits green, blue or ultraviolet light. For instance, combinations of gallium nitride (GaN), aluminum nitride (AlN) and indium nitride (InN) are suitable for demonstration of the invention. Cerium doped yttrium aluminum oxide-based light emitting diodes are also suitable for demonstration of the invention.

Inorganic phosphors typically consist of a host material with a small amount of activator dissolved therein. Particularly suitable phosphors include simple oxides, silicates, halosilicates, borates, aluminates and gallates, molybdates and tungstates, miscellaneous oxides, halides and oxyhalides, sulfates, ZnS-type sulfides, CaS-typed sulfides, double sulfides and miscellaneous sulfides and oxysulfides. Preferred simple oxides include CaO activated with Bi, Cd, Cu, Eu, Na, Mn, Pd, Sb, Sm, Tb, Tl or Zn; ZnO active with Al, Ga, S or Se; $ThO_2$ activated with Eu, Pr, or Tb; $Y_2O_3$ activated with Bi, Er, Eu, Ho, or Tb and $La_2O_3$ activated with Bi, Eu or Pb. Preferred silicates include $CaSiO_3$ activated with Ce, Eu, Pb, Ti or Mn; $Be_2SiO_4$ activated with Mn; $Mg_2SiO_4$ activated with Mn; $Zn_2SiO_4$ activated with Mn, P, As or Ti wherein at least a portion of the zinc can be substituted with beryllium; $Sr_2SiO_4$; $SrBaSiO_4$ activated with Eu; $Ba_2SiO_4$ activated with Eu, Ce, Li or Mn; $BaSi_2O_5$ activated with Eu or Pb; $Y_2SiO_5$ activated with Ce; $CaMgSi_2O_6$ activated with Eu or Mn; $Ca_2MgSi_2O_7$ preferably activated with Eu, or Mn; $Sr_2MgSi_2O_7$, $Ba_2MgSi_2O_7$, or $BaMg_2Si_2O_7$ or $BaSrMgSi_2O_7$ activated with Eu; $Ba_2Li_2Si_2O_7$ activated with Eu, Sn or Mn; $MgBa_3Si_2O_8$, $MgSR_3Si_2O_8$ or $Sr_3MgSi_2O_8$ activated with Eu or Mn; $Ca_5B_2SiO_{10}$ activated with Eu; $Ca_3Al_2Si_3O_{12}$ activated with Eu; and $LiCeBa_4Si_4O_{14}$ or $LiCeSrBa_3Si_4O_{14}$ activated with Mn. Preferred halosilicates include $LaSiO_3Cl$ activated with Ce or Tb; $Ca_3SiO_4Cl_2$ activated with Pb or Eu; $Ba_5SiO_4Cl_6$ activated with Eu and $Sr_5Si_4O_{10}C_{16}$ activated with Eu. Preferred phosphates include $YPO_4$ activated with Ce, Tb, Eu, Mn, Th or V; $LaPO_4$ activated with Ce or Eu; $CaP_2O_6$ activated with Mn; $Sr_2P_2O_7$ activated with Sn; $Ca_2P_2O_7$, $Li_2CaP_2O_7$ or $MgCaP_2O_7$ activated with Eu or Mn; $BaTiP_2O_7$; $MgSrP_2O_7$ or $MgBaP_2O_7$ activated with Eu or Mn; β-$Ca_3(PO_4)_2$ activated with Ce, Sn, Eu or Mn; α-$Ca_3(PO_4)_2$ activated with Ce, Sn, Eu or Tl; $CaB_2P_2O_9$ activated with Eu; β-$Sr_3(PO_4)_2$ activated with Sn, Mn, Al, or Eu; $Ba_3(PO_4)_2$ activated with Eu; $Na_3Ce(PO_4)_2$ activated with Tb; β-$(Ca,Sr)_3(PO_4)_2$ activated with Sn or Mn; $ZnMg_2(PO_4)_2$ activated with Mn; $Zn_3(PO_4)_2$ or $(Zn,Mg)(PO_4)_2$ activated with Mn; $Mg_3Ca_3(PO_4)_4$ activated with Eu; $MgSr_5(PO_4)_4$ activated with Sn; $CaSr_2(PO_4)_2$ activated with Bi; $MgBa_2(PO_4)_2$ activated with Sn or U; or $Sr_2P_2O_7$ activated with Eu. Preferred halophosphates include $X_5(PO_4)_3Y$ wherein X is Ca, Sr, Ba or combinations thereof, Y is F of Cl and the compound is activated by Mn, Sb, Sn, Eu or U. Preferred borates include $YBO_3$ or $LaBO_3$ activated with Ce or Eu; $SrO-3B_2O_3$, β-$SrO-3B_2O_3$ or α-$SrO-3B_2O_3$ activated with Pb, Mn, Eu, Cl or Sm; $MgB_2O_4$ or $CaB_2O_4$ activated with Mn or Pb; $MgYBO_4$ or $CaYBO_4$ or $CaLaBO_4$ activated with Bi or Eu; $ZnB_2O_4$ activated with Mn; $Ca_2B_2O_5$ activated with Mn; $LaAlB_2O_6$ activated with Eu; $CaLaB_3O_7$ activated with Ce or Mn; $SrB_4O_7$ activated with Eu, Pb or Mn or a europium halide; $Cd_2B_6O_{11}$ activated with Mn; $YAl_3B_4O_{11}$ activated with Ce, Bi, Eu, Cr, Th, Mn or Tb; $BaB_8O_{13}$ activated with Eu; $SrB_8O_{13}$ activated with Sm; $Ca_2B_5O_9X$ or $Sr_5B_5O_9X$ wherein X is a halide activated with Pb or Eu; $CaYB_{0.8}O_{3.7}$ activated with Eu; $Ca_2La2BO_{6.5}$ activated with Pb and $YAl_3B_4O_{12}$ activated with Ce or Mn. Preferred aluminates and gallates include $LiAlO_2$ activated with Fe or Mn; $YAlO_3$ activated with Ce, Eu, Sm or Tb; $LaAlO_3$ activated with Eu or Sm; $MgAl_2O_4$ or $MgGa_2O_4$ activated with Mn; $CaAl_2O_4$ activated with Mn or Eu; $ZnAl_2O_4$ or $ZnGa_2O_4$ activated with Mn; $CaGa_2O_4$ activated with Mn; $CaGa_4O_7$ activated with Mn; $SrAl_2O_4$ or $BaAl_2O_4$ activated with Eu; $CaAl_4O_7$ activated with Pb or Mn; $LiAl_5O_8$ activated with Fe or Mn; $Y_4Al_2O_9$ activated with Eu; $Y_3Al_5O_{12}$ activated with Ce; $KAl_{11}O_{17}$ or $KGa_{11}O_{17}$ activated with Tl or Mn; $Y_3Al_5O_{12}$ activated with Eu; $BaMgAl_{11}O_{17}$ activated with Ce, Eu or Mn; $Ca_{0.5}Ba_{0.5}Al_{12}O_{19}$ activated with Ce or Mn; and $SrAl_{12}O_{19}$ or $SrGa_{12}O_{19}$ activated with Eu, Mn or Ce. Preferred molybdates and tungstates include $CaMoO_4$ or $SrMoO_4$ optionally activated with Eu or U; $MgWO_4$ or $CaWO_4$; $Ca_3WO_6$, $Sr_3WO_6$, or $Ba_3WO_6$ activated with U; and $La_2W_3O_{12}$ activated with Eu. Preferred miscellaneous oxides include $LiInO_2$ activated with Eu or Sm; $LiLaO_2$ or $NaYO_2$ activated with EU; $CaTiO_3$ activate with Pr; $CaGeO_3$ activated with Mn; $Mg_2TiO_4$ activated with Mn; $Zn_2GeO_4$ activated with Mn; $YVO_4$ or $LaVO_4$ activated with Eu; $YAsO_4$ or $LaAsO_4$ activated with Eu; $Ca_5(VO_4)_3C_1$; $Mg_8Ge_2O_{11}F_2$ activated with Mn; $CaY_2ZrO_6$ activated with Eu; or $Mg_3SiO_3F_4$ activated with Ti. Halides and oxyhalides include halides of Mg, Ca, Sr, Zn Y, KMg, LiAl and $K_2Si$ activated with Mn, Ce, Eu, Tb, U or Th and oxyhalides of Y or La activated with Eu, Ce, Tb or Bi. Preferred sulfates include sulfates of Mg, Ca, Sr and combinations thereof activated with Eu, Pg, Mn, Be or Ce. Preferred ZnS type include sulfides of Zn or Cd activated Ag, Au, Cl, In, Al, Eu, Mn, Te, P, Sn, Li or Br. Preferred CaS type include sulfides of Mg, Ca, Sr or Ba activated with Eu, Bi, Na, Ce, Cu, Mn, La, Pb, Cl, Sb, Sm, Sn, F, Tb, Y, or Au. Preferred double sulfides include $CaGa_2S_4$ activate with Ce, Eu, Mn or Pb; $ZnGa_2S_4$ or $ZnBa_2S_3$ activated with Mn. Miscellaneous sulfides and oxysulfides include $SrAl_2S_4$ activated with Eu; $SrGa_2S_4$ activated with Pb; $BaAl_2S_4$ activated with Eu; $SrGa_2S_4$ activated with Ce; $SrGa_2S_4$ activated with Eu; $BaGa_2S_4$ activated with Ce or Eu; $Y_2O_2S$ activated with Eu or Tb; or $Gd_2O_2S$ activated with Tb. In addition to these inorganic phosphors organic light emitting diodes (OLED) can also be used in this invention.

EXAMPLES

Figure 6:
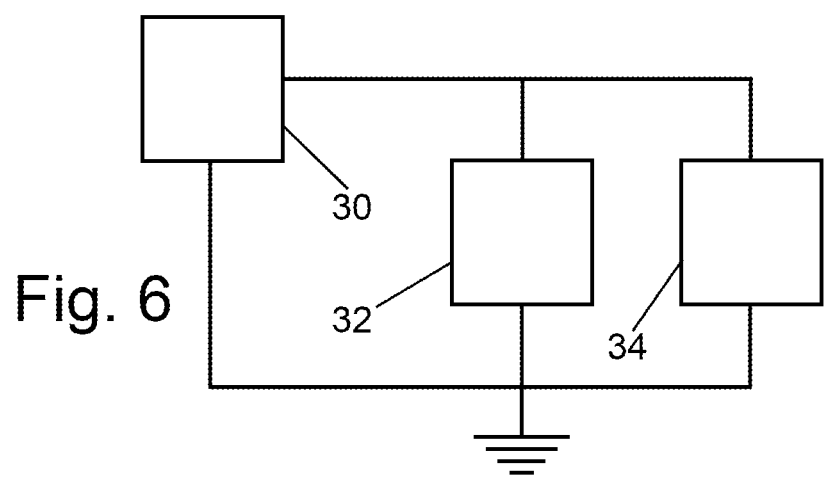
FIG. 6 is a schematic representation of an embodiment of the invention.

To demonstrate the ability of light emitting diodes to protect sensitive electronic components, like integrated circuits (IC's), from high voltage ESD pulses, a test circuit was developed where the light emitting diode and a sensitive component were mounted in a parallel circuit configuration for convenience and subjected to ESD pulses. The sensitive component selected for the test was a 27 pF 0603 size COG type MLCC that was designed to fail if the voltage across the capacitor exceeded 1000V as detailed in Table 2. The ESD pulse generator used for the test was the NoiseKen ESS-S3011A, with the GT-30RA gun, arranged in a configuration to generate the ESD current pulse described in IEC 61000-4-2 specification. The ESD pulse generator had a 150 pF source capacitor, a 1 MOhm charge resistor and a 330 Ohm discharge resistor. FIG. 6 is a schematic representation of the circuit arrangement.

Figure 7:
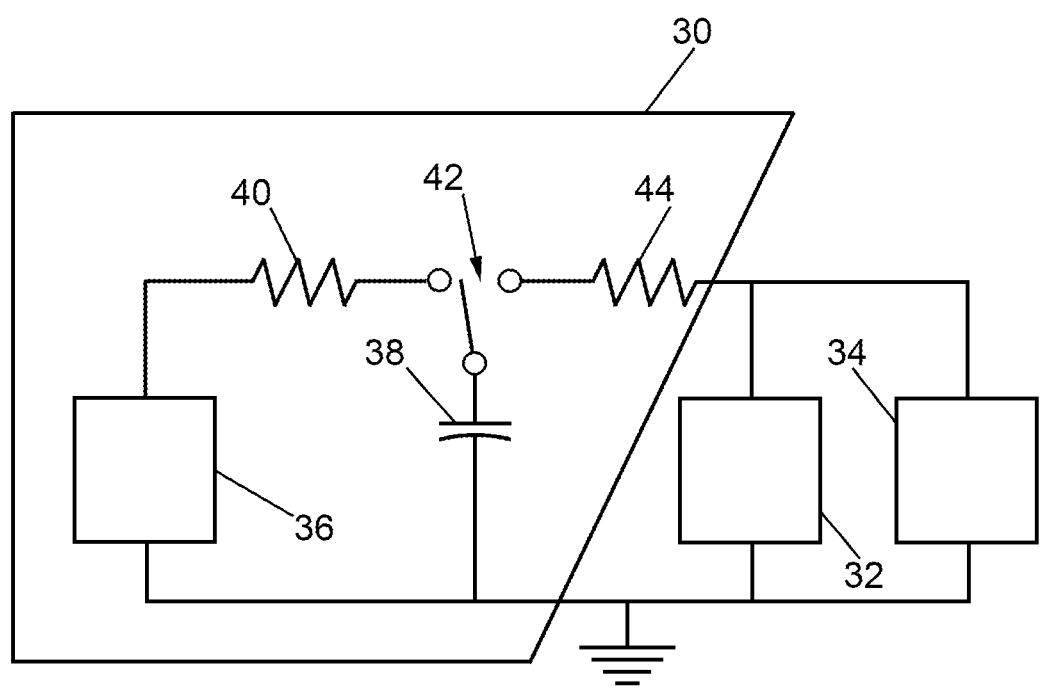
FIG. 7 is a schematic representation of an embodiment of the invention.

In FIG. 6, an ESD gun, 30, provides a pulse to an ESD protection device, 32, in electrical parallel with a sensitive component, 34. In FIG. 7, a high voltage pulse generator, 36, charges a source capacitor, 38, through a charge resistor, 40, when a switch, 42, is closed for the charging cycle and open for the test pulse as illustrated. When charge is complete the switch is opened for the charging cycle and closed for the test pulse thereby allowing the capacitor to discharge through a discharge resistor, 44, thereby pulsing the ESD protection device, 32, and sensitive component, 34, which are in electrical parallel for convenience. An ESD gun typically comprises the high voltage pulse generator, 36, source capacitor, 38, charge resistor, 40, and switch, 42, as an integrated device.

Figure 8:
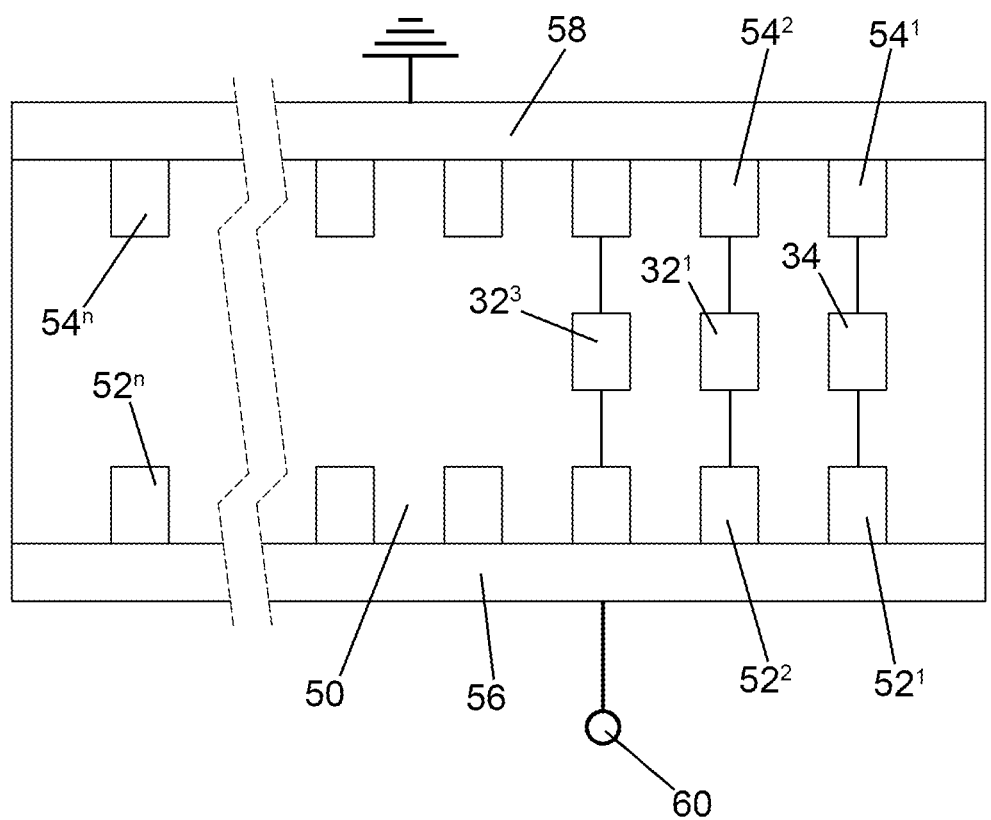
FIG. 8 is a schematic representation of an embodiment of the invention.

A test device configured for testing of parallel ESD protection devices and sensitive components is illustrated schematically in FIG. 8. In FIG. 8 combinations of sensitive components, 34, and ESD protection devices, 32, are mounted to connector tabs, 52 and 54, in a combination to be tested. In a particularly preferred arrangement sets of adjacent pairs are electrically isolated from the remainder of the connector tabs thereby allowing for a number of sequential tests of individually mounted pairs of sensitive components and ESD protection devices efficiently. The connector tabs connecting to each pair of devices are in electrical contact with connectors, 56, and ground connector, 58. An input lug, 60, allows the components, mounted in electrical parallel for convenience, to be subjected to a pulse of energy simultaneously for measurement of the results of the energy pulse.

To perform the test, the source capacitor in the ESD gun is charged to the test voltage and then discharged through the discharge resistor and into the test circuit. The voltage across the ESD protection device(s) and the sensitive test component increases until the trigger voltage of the ESD protection device is reached, at which time the ESD protection device(s) dissipates the excess energy by generating photons of light, in the case of a light emitting diode, or shunts the excess voltage to ground, in the case of a switching diode device, thereby protecting the sensitive component from damage. If the trigger voltage of the ESD protection device is higher than the voltage capability of the sensitive component, or if the ESD protection device is not able to sufficiently dissipate the energy the sensitive component may be damaged by the high voltage pulse.

Five light emitting diode part types were evaluated as ESD protection devices. They were selected based on their peak forward current rating and luminosity. Peak forward current varied from 100 to 1000 mA and luminosity varied from 430 to 13900 mcd. Light emitting diode components with higher peak current and luminosity ratings are expected to be better able to protect sensitive components from ESD pulses.

Five samples of each light emitting diode type were tested for their ability to protect the sensitive component from an 8 kV peak voltage pulse. Capacitance and insulation resistance of the sensitive test component were measured before pulsing and after every 10 pulses, up to a total of 100 pulses or until all five sensitive test components failed. A shift in capacitance of the sensitive component of more than 10% insulation resistance, or less than 100 GOhm, was considered a failure of the sensitive component. The same test was performed for 2 commercial ESD suppressors employing ceramic and polymer technologies as a comparison.

It can be seen from the results in Table 1 that light emitting diodes can protect a sensitive component from an 8 kV ESD pulse, and that light emitting diodes with peak current rating greater than 100 mA and/or a luminosity greater than 1500 mcd are especially effective ESD protection devices. In Table 1, Example 1 utilized a 1.6×0.8 mm light emitting diode from Wurth Electronics available as part number 150060G575000 having a rated forward voltage of 3.2 V, a typical capacitance of 50 pF, a luminosity of 430 mcd, a continuous forward current of 20 mA and a peak current of 100 mA. Example 2 utilized a 2.3×1.4 mm light emitting diode from Wurth Electronics available as part number 150224G573100A having a rated forward voltage of 3.1 V, a typical capacitance of 60 pF, a luminosity of 1500 mcd a continuous forward current of 20 mA and a peak current of 100 mA. Example 3 utilized a 3.2×2.8 mm light emitting diode from Vishay available as part number VLMR334BACB-GS08 having a rated forward voltage of 2.2 V, a typical capacitance of 74 pF, a luminosity of 2200 mcd a continuous forward current of 70 mA and a peak current of 100 mA. Example 4 utilized a 1.3×1.7 mm light emitting diode from Lumileds available as part number LXZ1-2780-5 having a rated forward voltage of 2.8 V, a typical capacitance of 1400 pF, a luminosity of 9160 mcd a continuous forward current of 1000 mA and a peak current of 1200 mA. Example 5 utilized a 13.35×13.35 mm light emitting diode from Cree Inc. available as part number CXA1304-0000-000C00B40E1 having a rated forward voltage of 9 V, a typical capacitance of >1400 pF, a luminosity of 36000 mcd a continuous forward current of 1000 mA and a peak current of 1200 mA. Examples 6 and 7 are for comparison. Example 6 utilized a 1.0×0.5 mm ceramic ESD suppressor from Murata Manufacturing available as part number LXES15AAA1-133 having a rated forward voltage of 15 V, a typical capacitance of 0.05 pF, no luminosity and a continuous forward current of <0.001 mA. Example 7 utilized a 1.6×0.8 mm polymer ESD Suppressor from Littelfuse available as part number AXGD10603 having a rated forward voltage of 32 V, a typical capacitance of 0.12 pF, no luminosity and a continuous forward current of <0.001 mA. The results of failure as a function of the number of pulses is provided in Table 1.

TABLE 1

| | Cumulative failures | | | | | | | | | |
|---|---|---|---|---|---|---|---|---|---|---|
| | Pulses | | | | | | | | | |
| Example | 10 | 20 | 30 | 40 | 50 | 60 | 70 | 80 | 90 | 100 |
| 1 | 0 | 0 | 0 | 1 | 5 | | | | | |
| 2 | 0 | 0 | 0 | 0 | 1 | 1 | 2 | 3 | 4 | 4 |
| 3 | 0 | 0 | 0 | 0 | 0 | 0 | 0 | 0 | 0 | 0 |
| 4 | 0 | 0 | 0 | 0 | 0 | 0 | 0 | 0 | 0 | 0 |
| 5 | 0 | 0 | 0 | 0 | 0 | 0 | 0 | 0 | 0 | 0 |
| 6 | 0 | 0 | 3 | 4 | 5 | | | | | |
| 7 | 0 | 1 | 3 | 5 | | | | | | |

As realized from Table 1, the prior art examples, 6 and 7, all failed by 40 pulses. Inventive Example 1 was marginally superior to the comparative examples 6 and 7. Example 2 was superior to the comparative examples. Preferred inventive examples 3-5 having a peak current rating greater than 100 mA and/or a luminosity greater than 1500 mcd were demonstrated to be particularly effective as ESD suppression devices.

An MLCC capacitor was prepared as a sensitive component for test purposes as detailed in Table 2. The capacitor was prepared with a 0603 EIA case size having low voltage capability. The MLCC capacitors were produced using class I, COG dielectric consisting primarily of calcium zirconate having a dielectric constant of about 32. The overall performance of these ESD sensitive test parts is provided in Table 2. In Table 2 the mean number of 800 V pulses to failure and mean number of 1 kV pulses to failure were pulsed in accordance with IEC 61000-4-2 wherein failure was defined as a part having an insulative resistance (IR) of less than 1000 GOhm. Performance was independent of pulse polarity.

TABLE 2

| ESD Test part performance | | | | | | |
|---|---|---|---|---|---|---|
| Capacitance (pF) | IR (GΩ) | Mean UVBD (V) | Standard deviation of UVBD (%) | Mean number of 800 V pulses to failure | Mean number of 1 kV pulses to failure | Mean number of 4 kV pulses to failure* |
| 27 | 34000 | 850 | 10.3 | 2300 | 4.2 | 1 |

The protective capability of commercially available light emitting diode parts purchased from Rohm as part number SML-P11MTT86R in a 0402 size rated at 1.9V and 1 mA was evaluated by placing the protective device in a circuit parallel with the voltage sensitive test part as described relative to FIG. 8. Capacitance and Insulation Resistance measurements of the test parts were taken before and after subjecting the ESD protection device/test piece pair to repeated 8 kV ESD pulses in accordance with International Electrotechnical Commission test procedure IEC 61000-4-2.

The protective performance of the tested ESD protection devices was evaluated using single components in both normal and reversed polarity, and as bidirectional pairs, which consisted of diodes paired with opposing polarities.

A typical test setup consists of a Noiseken ESS S3011/GT30R ESD simulator (150 pF 3300 combination) and Keysight MSOS 804A high definition oscilloscope with appropriate high bandwidth attenuation Test boards were subjected to IEC 61000-4-2 8 kV ESD pulses at a rate of 2 pulses per second, with the condition of the ESD sensitive component evaluated every 1000 pulses initially, rising to 2500 pulses once 10000 pulses were exceeded. The ESD sensitive test part was deemed to have failed when IR was <100GΩ.

The protective capabilities of light emitting diodes were evaluated for single components in both forward polarity (A) and reversed polarity (B), and bidirectional light emitting diode pairs (C). Components were exposed to 8 kV Pulses in accordance with IEC 61000-4-2. The results are provided in Table 3.

TABLE 3

| Light emitting diode configuration | Pcs Tested | Total Pulses | Total Failures | Mean Pulse to Failure |
|---|---|---|---|---|
| A | 10 | 117500 | 1 | 117500 |
| B | 10 | 83000 | 6 | 13833 |
| C | 9 | 112500 | 0 | 112500 |

In Table 3 the Mean Pulses to Failure of the sensitive component was calculated as $$MPTF = \frac{\text{Total \# ESD pulses applied to test population}}{\text{Total \# failures, or 1, whichever is larger}}$$

Without any protective device in place ESD sensitive test components would fail upon exposure to a single 8 kV pulse. As illustrated in Table 3 commercial light emitting diodes can successfully protect a sensitive component from multiple 8 kV ESD discharges. Of particular importance is the success of a pair of light emitting diodes in parallel having opposite polarity.

In actual operational situations the polarity of any ESD event is not predictable, so the polar nature of diodes is problematic with respect to their use for ESD protection. When protected by a single forward biased light emitting diode, one of ten ESD test components failed when exposed to a maximum of 12500 8 kV+ve ESD pulses per IEC62000-4-2. When protected by identical light emitting diodes with reversed polarity six of ten ESD test components failed prematurely under similar test conditions. Zero of nine ESD sensitive components failed when protected by bidirectional pairs of light emitting diodes exposed to a similar test regime.

By arranging light emitting diodes in a bidirectional configuration, the discharge of any polarity can be repeatedly diverted away from an ESD sensitive element, with protection durability levels at least equal to those of a single component exposed to positive polarity pulses alone.

The invention has been described with reference to the preferred embodiments without limit thereto. One of skill in the art would realize additional embodiments and improvements which are not specifically stated but which are within the meets and bounds of the claims appended hereto.

The invention claimed is:

1. A protected electric circuit comprising:
   at least one sensitive device wherein said at least one sensitive device operates at a device voltage and has a maximum voltage capability;
   and at least one light emitting diode electrically connected with said at least one said sensitive device wherein said at least one light emitting diode has a first trigger voltage wherein said first trigger voltage is above said device voltage and below said maximum voltage capability and wherein at an extraneous voltage above said first trigger voltage said at least one light emitting diode emits photons thereby converting at least some of said extraneous voltage to photon energy;
   wherein said at least one light emitting diode is electrically in parallel with at least one second light emitting diode and with said at least one sensitive device; and
   wherein said at least one light emitting diode and said second light emitting diode have opposite polarity.

2. The protected electric circuit of claim 1 wherein said device voltage is below said maximum voltage capability.

3. The protected electric circuit of claim 1 wherein at least 2% to no more than 40% of said extraneous voltage is converted to said photon energy.

4. The protected electric circuit of claim 3 wherein at least 10% of said extraneous voltage is converted to said photon energy.

5. The protected electric circuit of claim 1 wherein said device voltage is no more than 25% of said extraneous voltage.

6. The protected electric circuit of claim 5 wherein said device voltage is no more than 10% of said extraneous voltage.

7. The protected electric circuit of claim 6 wherein said device voltage is no more than 1% of said extraneous voltage.

8. The protected electric circuit of claim 1 wherein said at least one light emitting diode diverts a portion of said extraneous voltage to electrical ground.

9. The protected electric circuit of claim 1 further comprising at least one additional ESD protection device electrically connected to said light emitting diode.

10. The protected electric circuit of claim 9 wherein said at least one additional ESD protection device is selected from the group consisting of a switching diode, a spark gap device and a varistor.

11. The protected electric circuit of claim 9 wherein said at least one additional ESD protection device has a second trigger voltage.

12. The protected electric circuit of claim 11 wherein said first trigger voltage and said second trigger voltage are the same.

13. The protected electric circuit of claim 11 wherein said first trigger voltage is lower than said second trigger voltage.

14. The protected electric circuit of claim 1 further comprising a sensor capable of detecting photons emitted from said at least one light emitting diode.

15. The protected electric circuit of claim 14 further comprising a power supply wherein said power supply provides a power level.

16. The protected electric circuit of claim 14 wherein said power level is modified in response to said sensor detecting said photons.

17. The protected electric circuit of claim 14 further comprising an element for recording said sensor sensing said photons.

18. The protected electric circuit of claim 1 wherein said at least one light emitting diode has at least one of a peak current of >100 mA or a luminosity of greater than 1500 mcd.

19. The protected electric circuit of claim 1 wherein said at least one light emitting diode has a peak current of >100 mA and a luminosity of greater than 1500 mcd.

20. The protected electric circuit of claim 1 wherein said at least one light emitting diode is an organic light emitting diode.

21. The protected electric circuit of claim 1 wherein said at least one light emitting diode is a phosphor.

22. The protected electric circuit of claim 1 wherein said first light emitting diode is an inorganic light emitting diode.

23. A method of protecting an electric circuit comprising:
   at least one sensitive device wherein said at least one sensitive device operates at a device voltage and has a maximum voltage capability;
   a pair of light emitting diodes wherein said pair of light emitting diodes comprises a first light emitting diode and a second light emitting diode wherein said first light emitting diode and said second light emitting diode are in electrical parallel and electrically connected with said at least one sensitive device wherein said first light emitting diode has a first trigger voltage wherein said first trigger voltage is above said device voltage and below said maximum voltage capability and wherein at any extraneous voltage above said first trigger voltage first light emitting diode emits photons thereby converting at least some of said extraneous voltage to photon energy thereby providing a device voltage wherein said device voltage energizes said at least one sensitive device;

wherein said pair of light emitting diodes is in electrical parallel with said at least one sensitive device; and wherein said first light emitting diode and said second light emitting diode have opposite polarity.

24. The method of protecting an electric circuit of claim 23 wherein said device voltage is below said maximum voltage capability.

25. The method of protecting an electric circuit of claim 23 wherein at least 2% to no more than 40% of said extraneous voltage is converted to said photon energy.

26. The method of protecting an electric circuit of claim 25 wherein at least 10% of said extraneous voltage is converted to said photon energy.

27. The method of protecting an electric circuit of claim 26 wherein said device voltage is no more than 10% of said extraneous voltage.

28. The method of protecting an electric circuit of claim 27 wherein said device voltage is no more than 1% of said extraneous voltage.

29. The method of protecting an electric circuit of claim 23 wherein said device voltage is no more than 25% of said extraneous voltage.

30. The method of protecting an electric circuit of claim 23 wherein said first light emitting diode converts a portion of said extraneous voltage to electrical ground.

31. The method of protecting an electric circuit of claim 23 further comprising at least one additional ESD protection device electrically connected with said first light emitting diode.

32. The method of protecting an electric circuit of claim 31 wherein said at least one additional ESD protection device is selected from the group consisting of a switching diode, a spark gap device and a varistor.

33. The method of protecting an electric circuit of claim 31 wherein said at least one additional ESD protection device has a second trigger voltage.

34. The method of protecting an electric circuit of claim 33 wherein said first trigger voltage and said second trigger voltage are the same.

35. The method of protecting an electric circuit of claim 33 wherein said first trigger voltage is lower than said second trigger voltage.

36. The method of protecting an electric circuit of claim 23 further comprising a sensor capable of detecting photons emitted from said first light emitting diode.

37. The method of protecting an electric circuit of claim 36 further comprising a power supply wherein said power supply provides a power level.

38. The method of protecting an electric circuit of claim 37 wherein said power level is modified in response to said sensor detecting said photons.

39. The method of protecting an electric circuit of claim 36 further comprising an element for recording said sensor sensing said photons.

40. The method of protecting an electric circuit of claim 23 wherein said first light emitting diode has at least one of a peak current of >100 mA or a luminosity of greater than 1500 mcd.

41. The method of protecting an electric circuit of claim 23 wherein said first light emitting diode has a peak current of >100 mA and a luminosity of greater than 1500 mcd.

42. The method of protecting an electric circuit of claim 23 wherein said first light emitting diode is an organic light emitting diode.

43. The method of protecting an electric circuit of claim 23 wherein said first light emitting diode is a phosphor.

44. The method of protecting an electric circuit of claim 23 wherein said first light emitting diode is an inorganic light emitting diode.

* * * * *